United States Patent
Bernhard et al.

(10) Patent No.: US 7,478,720 B2
(45) Date of Patent: Jan. 20, 2009

(54) WORKPIECE CHANGER FOR MACHINING MACHINES

(75) Inventors: Franz-Xaver Bernhard, Spaichingen (DE); Tobias Schworer, Konigsheim (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 351 days.

(21) Appl. No.: 11/175,197

(22) Filed: Jul. 7, 2005

(65) Prior Publication Data

US 2006/0010681 A1 Jan. 19, 2006

(30) Foreign Application Priority Data

Jul. 15, 2004 (EP) .................................. 04016654

(51) Int. Cl.
*B65G 37/00* (2006.01)
(52) U.S. Cl. ............... 198/346.1; 414/223.01; 414/226.02
(58) Field of Classification Search ............. 198/346.1, 198/346.2; 414/225.01, 226.01, 226.05, 414/744.3, 222.01, 222.07, 222.08, 222.09, 414/223.01, 226.02, 226.03
See application file for complete search history.

(56) References Cited

U.S. PATENT DOCUMENTS

| | | | | | |
|---|---|---|---|---|---|
| 3,825,245 | A | * | 7/1974 | Osburn et al. ............ | 198/346.1 |
| 4,373,840 | A | | 2/1983 | Miller, Jr. | |
| 4,654,955 | A | * | 4/1987 | Mathie ................... | 414/226.02 |
| 4,781,512 | A | | 11/1988 | Ohta et al. | |
| 4,797,989 | A | * | 1/1989 | Cherko .................... | 198/345.3 |
| 5,135,349 | A | * | 8/1992 | Lorenz et al. .......... | 414/226.01 |
| 5,232,505 | A | * | 8/1993 | Novak et al. ............ | 414/223.01 |
| 5,564,889 | A | * | 10/1996 | Araki ......................... | 414/806 |
| 5,584,647 | A | * | 12/1996 | Uehara et al. .......... | 414/226.01 |
| 5,781,983 | A | | 7/1998 | Gruener | |
| 5,963,753 | A | * | 10/1999 | Ohtani et al. ............... | 396/611 |
| 5,972,110 | A | * | 10/1999 | Akimoto ...................... | 118/52 |
| 5,989,342 | A | * | 11/1999 | Ikeda et al. ................... | 118/52 |
| 6,314,658 | B2 | * | 11/2001 | Kato et al. ..................... | 34/406 |
| 6,371,713 | B1 | * | 4/2002 | Nishimura et al. ..... | 414/222.13 |
| 6,679,369 | B2 | * | 1/2004 | Okuyama ................ | 198/346.1 |
| 6,688,452 | B2 | * | 2/2004 | Watanabe et al. ........ | 198/346.1 |
| 7,108,647 | B2 | * | 9/2006 | Nakazawa et al. ............ | 483/14 |
| 2004/0079617 | A1 | | 4/2004 | Bernhard et al. | |

FOREIGN PATENT DOCUMENTS

| | | |
|---|---|---|
| DE | 198 53 945 A1 | 6/2000 |
| EP | 1 201 354 A2 | 5/2002 |
| EP | 1 321 224 A1 | 6/2003 |
| GB | 2 135 604 A | 9/1984 |

* cited by examiner

*Primary Examiner*—James R Bidwell
(74) *Attorney, Agent, or Firm*—Browdy and Neimark, P.L.L.C.

(57) ABSTRACT

A workpiece changer for transfer of workpiece palettes between a storage arrangement arranged in front of a machining machine for such workpiece palettes and a workpiece table, possesses a gripper device for receiving and putting down workpiece palettes and a rotary drive for swiveling the gripper device about a vertical axis. A linear drive serves to shift the gripper means between a first position on the storage arrangement and a second position on the workpiece table. The storage arrangement possesses at least one change station for the transfer and acceptance of workpiece palettes by the gripper device, a conveyor apparatus being provided for the supply and removal of workpiece receiving station to and from the change station. Accordingly, satisfactory access is provided to the workpiece table during machining and workpiece changing operations may be performed at a high speed on any desired machining machines.

12 Claims, 3 Drawing Sheets

WORKPIECE CHANGER FOR MACHINING MACHINES

BACKGROUND OF THE INVENTION

The invention relates to a workpiece changer for the transfer of workpieces or workpiece palettes between a storage arrangement placed in front of a machining machine and a workpiece table of such machining machine, comprising a gripper means for taking up and putting down workpieces or workpiece palettes, and a rotary drive for swiveling the gripper means about a vertical axis.

THE PRIOR ART

In the case of such a workpiece changer as disclosed in the European patent publication 1 321 224 B1 the gripper means is arranged pivotally on the free end of a pivotal lever. The combination of the two necessary pivotal movements requires a relatively complex kinematic control and a storage arrangement or a set-up station must be arranged relatively close to the workpiece table to be within the range of sweep of the pivotal arm.

A known workpiece changer disclosed in the German patent publication 19,853,945 A1 possesses a double gripper pivotal about a vertical axis having a vertically acting lifting means and. This workpiece changer requires at least one workpiece table able to travel in at least on a linear horizontal axis, of the machining machine and must therefore also be arranged directly on the machine frame of the machining machine. Since not all machining machines possess a workpiece table able to be shifted in this manner, this known workpiece changer has only an extremely limited range of application. It must be arranged directly on the machine frame of the machining center so that the work table of the machining machine is only accessible with substantial difficulty.

A workpiece changer disclosed in the European patent publication 1 201 354 A2 also possesses a double gripper able to pivot about a vertical axis, a set-up station being possibly arranged spaced apart from the machining machine. For this purpose an additional linear shifting arrangement is necessary, the transfer of workpieces or workpiece carriers between the double gripper and the linear shifting arrangement being however technically complex and slow. For the complete arrangement there is also a relatively large space requirement. Since the double gripper can not be spatially decoupled from the set-up station or a storage arrangement, its functionality is also limited.

SHORT SUMMARY OF THE INVENTION

One object of the invention is to provide a workpiece changer of the type initially mentioned, which is decoupled from the machining machine renders possible the transfer of workpieces or workpiece palettes between a storage arrangement relatively far from the workpiece table and such workpiece table and provides for satisfactory accessibility to the machining machine or, respectively, its workpiece table.

In order to achieve these and/or other objects appearing from the present specification, claims and drawings, the present invention provides a linear drive for shifting the gripper means between a first position at the storage arrangement and a second position at the workpiece table, the storage arrangement possessing at least one change station for the transfer and acceptance of workpieces or workpiece palettes by the gripper means and a conveyor means being provided for the supply and removal of palette and/or workpiece receiving means to and from the change station.

The workpiece changer in accordance with the invention renders possible very good accessibility to the machining machine, since during machining it can be shifted into a parked position, in which it is not in the way, by means of the linear drive. Accordingly the zone in front of the machining machine is kept clear for access by the operator. A linear movement of the workpiece table is not necessary so that the workpiece changer may be employed for the most various different types of machines. The gripper means may be decoupled both from the storage arrangement and also from the machining table that is to say from the machining machine. The gripper means performs all necessary movements so that only one shifting system is necessary and transfer operations for workpieces or palettes between the workpiece table and the storage arrangement are unnecessary.

The measures recited in the dependent claims constitute advantageous further developments and improvements in the workpiece changer defined in claim 1.

The conveyor means is preferably an endless conveyor means and more particularly a chain conveyor or turntable or a linear conveyor.

The conveyor means as a whole or its palette and/or the workpiece receiving means and/or the gripper means may in an advantageous design be provided with a shifting drive directed to the change station. The same preferably runs athwart the direction of motion of the linear drive, if the change station is positioned to the side of the path of movement of the linear drive. Furthermore the conveyor means as a whole or its palette and/or the workpiece receiving means and/or the gripper means may be provided with a lifting drive.

In an advantageous manner a further set-up station may be provided at the end of the linear drive or to the side thereof, the gripper means being provided, in the case of a provision on the side, with a shifting drive running athwart the direction of motion of the linear drive. This set-up station may be provided with the same moving mechanisms, present in any case with it, for the transfer of workpieces or workpiece palettes between the storage arrangement and the workpiece table. It is merely necessary to have an additional shifting drive normal to the direction of motion of the linear drive.

The gripper means is arranged on a horizontally moving slide or carriage, which is provided with the lifting means and the rotary drive. This slide all therefore participates in all movements. It preferably runs on a lateral guide means, which is accordingly offset in relation to the workpiece table and ensures even better accessibility.

The gripper means possesses a simple gripper or a double gripper with grippers pointing in opposite directions. More particularly with a double gripper design it is possible for the changing operation to be implemented even more rationally, since for example simultaneously on the one side a worked workpiece and on the other side an unworked workpiece (or workpiece palettes) may be transported.

The gripper or grippers are designed to be placed underneath a workpiece or a workpiece palette and preferably possess two gripping and/or lifting arms. They may in principle be designed in accordance with the prior art initially referred t (for example the European patent publication 1 321 224 B1).

The gripper or grippers may also have two gripping and/or lifting arms, which are able to be shifted toward each other like gripping jaws. Accordingly different types of workpieces and/or workpiece palettes may be transferred.

The workpiece changer in accordance with the invention is best made in the form of a self-contained unit able to be positioned in front of the machining machine so that use is possible independently of the type of machining machine and simple upgrading of existing equipment is possible.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
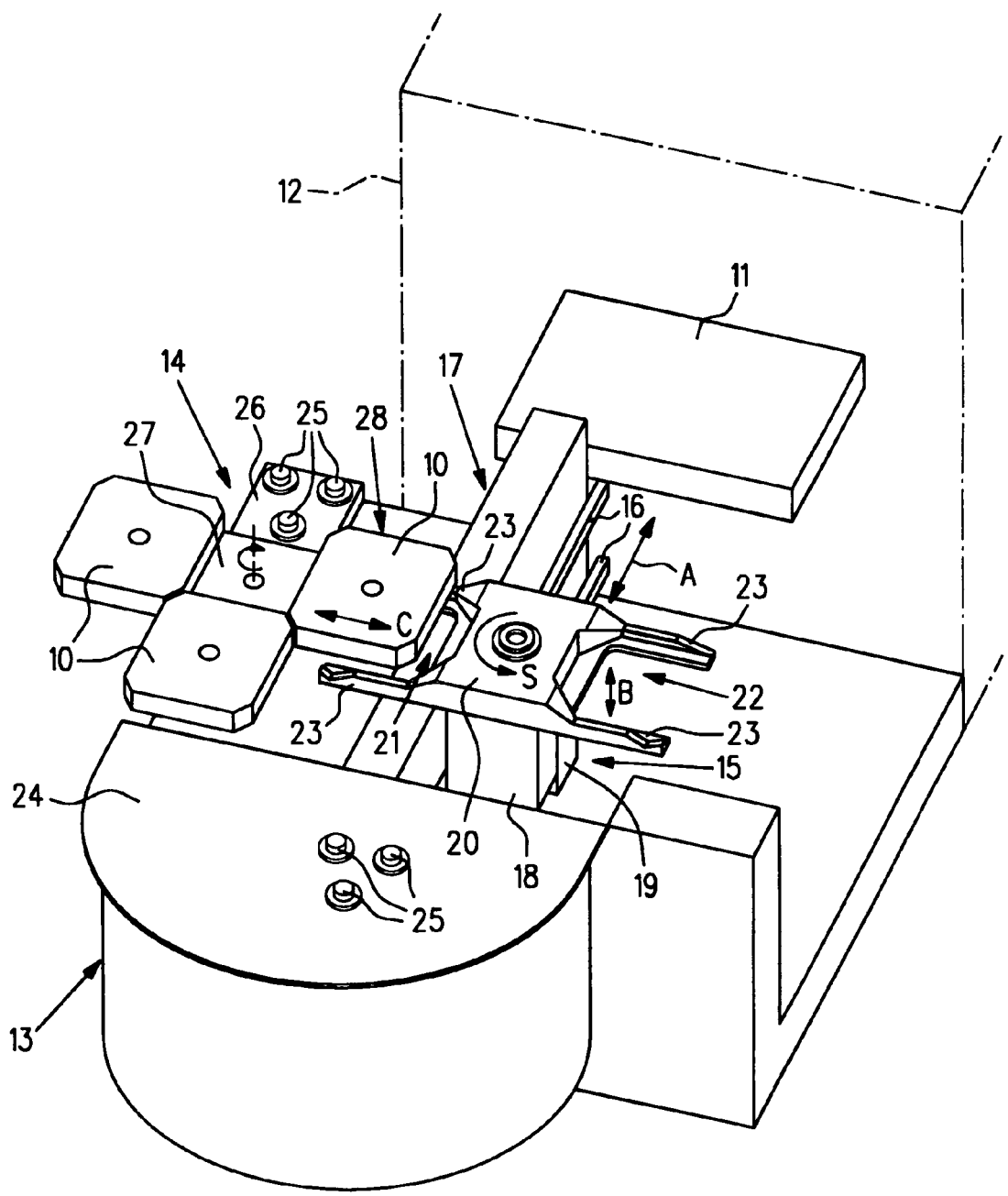
FIG. 1 is a perspective representation in detail of a workpiece changer with a set-up station and a storage arrangement for workpieces and/or workpiece palettes as a first embodiment of the invention.

The workpiece changer represented in FIG. 1 serves to transfer workpieces and/or workpiece palettes 10 between a workpiece table 11 of a machining machine 12 only depicted diagrammatically and a set-up station 13 and furthermore between a storage arrangement 14 for workpiece palettes 10 or workpieces and the workpiece table 11 and/or the set-up station 13. In the case of the machining machine 12 it may be for example be a milling machine or a multiple machining machine such as a machining center that can perform further machining operations.

A slide arrangement 15 runs on two horizontal guide rails 16 of a guide means 17 which is located in the intermediate space between the workpiece table 11 and the set-up station 13. A linear drive which comprises guide rails 16 and a first slide or carriage 18 or linearly moving drive, not illustrated as for example a toothed belt, a linear motor drive, a lead screw drive or a fluid power drive, moves the first slide or carriage 18 horizontally or laterally along the guide rails 16. On this first slide 18 a second slide 19 is vertically guided and driven and serves as a lifting drive for a gripper means 20 arranged on its top side. This gripper means 20 is rotatable by means of a rotary drive, not illustrated, about a vertical axis on the second slide 19.

The gripper means 20 is designed in the form of a double gripper means and possesses two grippers 21 and 22 pointing in opposite direction which respectively possess two U-like gripper arms 23. Such gripper arms serve to fit underneath and lift or lower workpiece palettes 10 or workpieces.

The set-up station 13 may be fixedly mounted on the entire workpiece changer means or may be designed in the form of a separate set-up table. A positioning means for workpiece palettes comprising three positioning elements 25 is arranged on a set-up plate 24, the workpiece palettes 10 possessing bottom side recesses corresponding to this purpose. It is naturally possible for other known positioning means for workpiece palettes 10 or workpieces to be provided, which may also be interchangeable.

The storage arrangement 14 that for example is designed as an intermediate storage means for workpiece palettes 10 or workpieces and frequently is also termed a palette reloading station, is designed in the form of a rotary stepper means with a rotary drive, not illustrated in detail. A turntable/holding means 27 which serves as conveyor means or endless conveyor means having four palette/workpiece receiving means 26 able to be moved in steps about a vertical axis so that a palette/workpiece receiving means 26 or a workpiece palette 10 on it is arranged at a change station 28, which is positioned for the gripper means 20. The entire storage arrangement 14 is arranged to the side of the guide means 17, the change station 28 overlapping the guide means 17.

In the view in accordance with FIG. 1 the gripper means is positioned for receiving a workpiece palette 10 from the storage arrangement 14. By lifting the second slide 19 the two gripper arms 23 of the one gripper 21 are fitted underneath the workpiece palette 10 on the change station 28 and start lifting it. After a pivoting movement through 90 degrees in the pivoting direction S and a following linear movement of the first slide 18 the workpiece palette 10 may be put down on the set-up station 13 and fitted with a tool in accordance with the operation to be performed or prepared for the. machining operation in some other way. The lowering of the set-up station 13 is again performed using the second slide 19. The workpiece palette 10 may however be directly supplied to the workpiece table 11. For this purpose the gripper means 20 and the slide arrangement 15 perform a pivotal movement through 90 degrees in the opposite direction to the pivoting direction S and then the workpiece palette 10 may be supplied by means of a linear movement of the first slide 18 and following lowering to the workpiece table 11.

During the transfer of a workpiece palette 11 between the set-up station 13 and the workpiece table 11 the gripper means 20 performs a pivotal motion through 180 degrees. This is for example the case, when a workpiece palette 10 prepared at the set-up station is supplied to the workpiece table 11 or when a workpiece palette 10 machined on the workpiece table 11 is then again supplied to the set-up station 13 in order to either clean or dismount the workpieces located thereon.

Since the gripper means 20 is designed in the form of a double gripper a workpiece palette 10 prepared for machining may for example supplied to the workpiece table 11, the so far unengaged gripper firstly lifting a workpiece palette 10 (which has been handled) and after a pivoting operation through 180 degrees lowers the so far not handled workpiece palette 10 on to the workpiece table 10. If the gripper means 20 in accordance with a simpler design has only one gripper, this multiple operation is naturally not possible, i. e. firstly a processed workpiece palette 10 must be taken from the workpiece table 11 and either handed over to the set-up station 13 or the storage arrangement 14 before a so far unprocessed workpiece palette 10 is collected from it and supplied to the workpiece table 11.

The four palette receiving means 26 of the turntable/holding means 27 are also provided with corresponding positioning elements 25 in order to position the workpiece palette 10. Since the storage means 14 in the illustrated working example is fitted with three workpiece palettes 10, only one of the four palette receiving means 26 is visible.

If the gripper arms 23 should not extend as far as the change station 28, the slide arrangement 15 or the individual palette receiving means 26 may be fitted with a shifting drive not illustrated in detail, which provides for horizontal shifting in the direction C normal to the direction A of motion of the linear drive of the first slide 18.

The guide means 17 is laterally offset from the workpiece table 11 and the first slide 18 runs on this guide means 17. Accordingly it is possible for the first slide 18 and with it naturally the second slide 19 and the gripper means 20 to be shifted away from the workpiece table 11 during machining so that satisfactory accessibility to same is ensured during machining. In an alternative design the guide rails may in principle also be arranged on the floor of the workpiece changer arrangement, it also being possible for the first slide 18 to be in the form of a carriage or the like.

In the working embodiment illustrated the gripper arms 23 of the grippers 21 and 22 are in the form of rigid arms and designed to fit underneath workpiece palettes 10. Alternatively or in a complementary manner it is possible for the gripper arms 23 also to be moved toward one another like gripping jaws in order to engage different workpiece palettes 10 or differently shaped workpieces.

The arrangement of the set-up station 13 and of the storage arrangement 14 may also be reversed so that the storage arrangement 14 is then at the end of the guide means 17 and the set-up station 13 is arranged to the side of the guide means 17. Moreover, in a simpler design it is possible to have only one set-up station 13 or only one storage arrangement 14. More particularly in a case in which only one storage arrangement 14 is provided, in lieu of having the vertical stroke in the direction B performed by the second slide 19, such slide may be dispensed with and the storage arrangement 14 or the holding means 27 or, respectively, the individual palette receiving means 26 may be provided with reciprocating means for motion in the vertical direction B. This as well makes it possible to lower palettes onto the gripper means 20 or to lift them therefrom. For depositing on the workpiece table 11 the latter must be then also provided with a vertical drive.

The overall workpiece changer arrangement may be permanently mounted on a machining machine 12 or as a complete workpiece changer arrangement only be placed in front of same.

Figure 2:
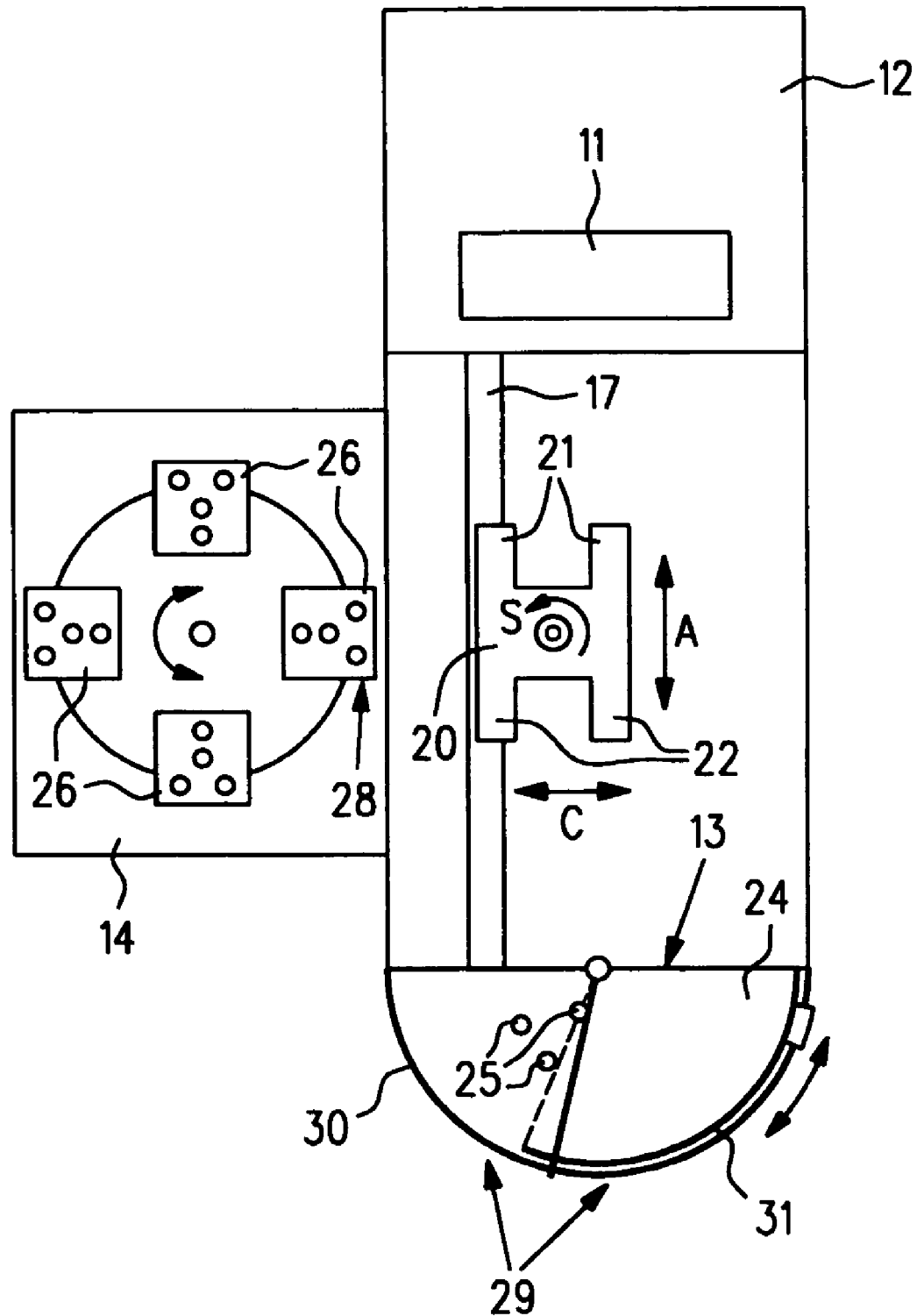
FIG. 2 shows a second embodiment of the invention in a view looking downward, with a modified shifting drive arrangement.

The working example illustrated in FIG. 2 is substantially similar to the example depicted in FIG. 1, identical or functionally equivalent components or subassemblies is being provided with the same reference numerals and not being described twice over. Unlike the first working example the storage arrangement 14 or its palette receiving means 26 lack a shifting drive acting in the shift direction C. Such a drive is accordingly integrated on the slide arrangement 15 for the gripper means 20. This means that a third slide, not illustrated, of the second slide 19 is able to be moved in the shifting direction C by a motor. It is naturally also possible for such shifting drives to be provided in the storage arrangement 14 too.

In the second working embodiment the set-up station 13 is provided with a screen 29 extending vertically upward from the floor or from the plane of the set-up plate 24. It comprises a fixed wall portion 30 and a pivoting wall portion 31, which may be pivoted into the fixed wall portion 30 and beyond it in order to be able to prepare or fettle workpieces individually or held on a palette 11.

It is also to be mentioned that the storage arrangement 14 is naturally not limited to having only four palette receiving means 26 and the number thereof may be smaller or more particularly larger.

Figure 3:
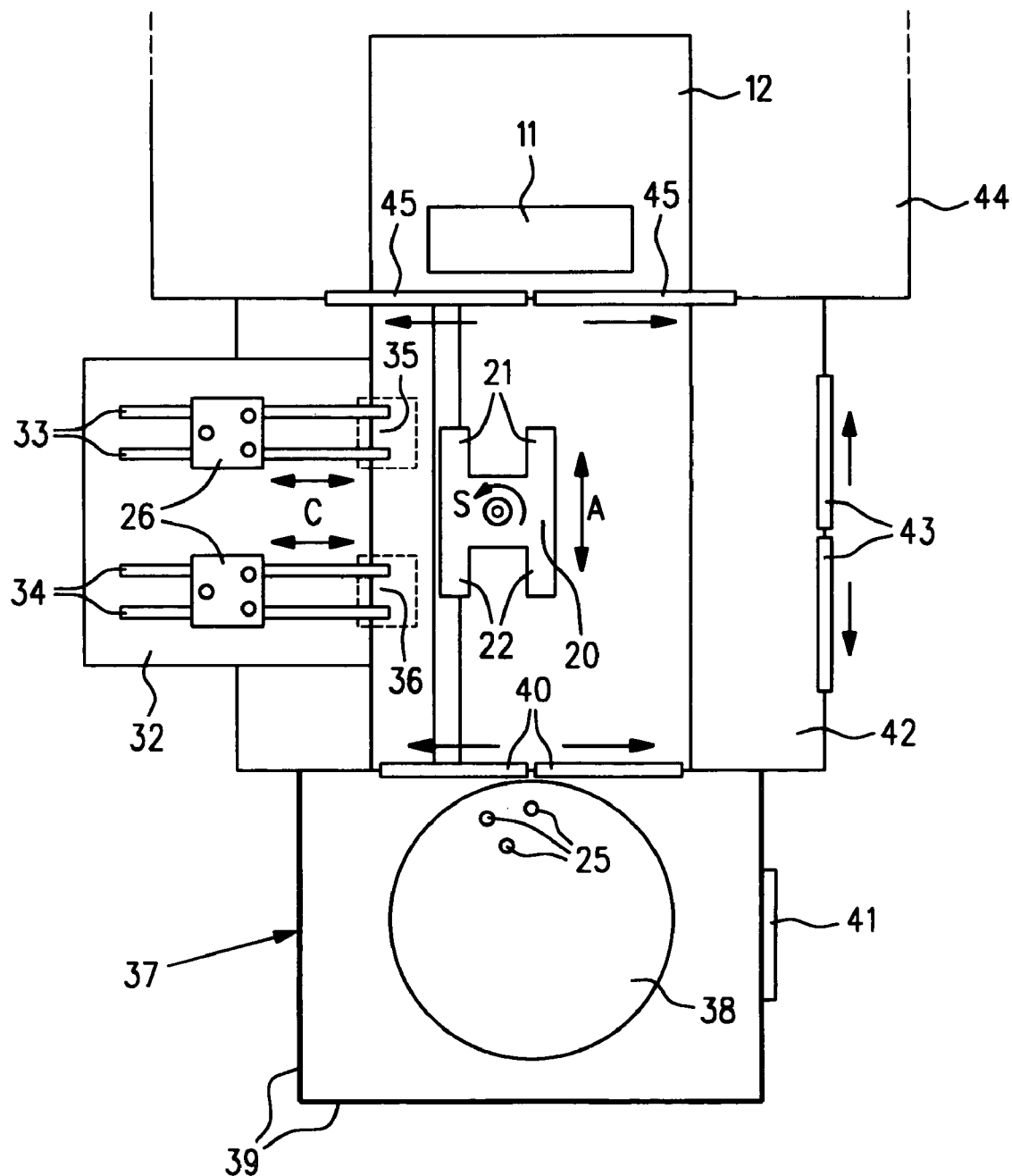
FIG. 3 shows a third embodiment of the invention in a view looking downward with a differently designed storage arrangement and an altered arrangement of the set-up station.

In the case of the third working example illustrated in FIG. 3 identical or functionally equivalent components or subassembly are again provided with the same reference numerals and not described twice over. Instead of the storage arrangement 14 having one rotary table or turntable there is now a storage arrangement 32 having two linear guides/conveyors 33 and 34 along which the palette receiving means 26 are able to be shifted by means of linear drives, not illustrated, to and from change stations 35 and 36 in order to be accepted by the gripper means 20 or to be released by same. In the simplest case it is possible for there to be only one linear guide/conveyor 33 or, respectively, 34 or a larger number of linear guides/conveyors may be provided. After the removal or acceptance of a workpiece palette 10 or of a workpiece the respective palette receiving means 26 is shifted away from the respective associated change station 35 or, respectively, 36 in order to be removed or loaded at a transfer station leading to a principal storage means.

In this working example a set-up station 37 is provided having a set-up plate 38, which for its part may be arranged at the end of the guide means 17 in a fixed or detachable manner. The set-up station 37 is here designed in the form of a set-up chamber having side walls 39, sliding doors 40 being able to open the set-up station 37 toward the guide means 17 and shut it off therefrom. A door 41 for a set-up operator is also provided.

The guide means 17 as well is arranged in a guide chamber 42, which has sliding doors 42 for entry. This guide chamber 42 adjoins a chamber-like surrounding wall 44 of the machining machine 12, there again being sliding doors 45 opening for access to the workpiece table 11 or shutting it off.

The working examples in accordance with FIGS. 2 and 3 as well may, in simpler designs, possess only one set-up station or only one storage arrangement, which may be positioned to the side or at the end of the guide means 17.

The invention claimed is:

1. A workpiece changer for transfer of workpieces or workpiece palettes between a storage arrangement in a front of a machining machine for such workpieces and/or workpiece palettes and a workpiece table of such machining machine, comprising:

a gripper means for taking up and putting down workpieces or workpiece palettes, a linear drive for transfer of the gripper means between a first position at the storage arrangement and a second position at the workpiece table, wherein the gripper means is rotatable about a vertical axis when moving between the first position and the second position, the storage arrangement possessing at least one change station for delivery and acceptance of workpieces or workpiece palettes by the gripper means, and a conveyor means for the supply and removal of palette and/or workpiece receiving means to and from the change station, wherein the gripper means is a double gripper with grippers pointing in opposite directions.

2. The workpiece changer as set forth in claim 1, wherein the conveyor means is an endless conveyor means in the form of a turntable or a linear conveyor.

3. The workpiece changer as set forth in claim 1, wherein the conveyor means as a whole or palette thereof and/or workpiece receiving means and/or the gripper means are shiftable in a direction towards the change station.

4. The workpiece changer as set forth in claim 3, wherein the shiftable direction extends athwart a linear path of movement of the linear drive.

5. The workpiece changer as set forth in claim 1, wherein the conveyor means as a whole or palette thereof and/or workpiece receiving means and/or the gripper means have a lifting drive.

6. The workpiece changer as set forth in claim 1, wherein a set-up station is provided at an end or a side of the linear drive, the gripper means being shiftable, in the case of a provision on the side, running athwart the direction of motion of the linear drive.

7. The workpiece changer as set forth in claim 5, wherein the gripper means is provided on a horizontally movable slide or carriage which is rotatable, and provided with the lifting drive.

8. The workpiece changer as set forth in claim 7, wherein the slide or the carriage runs on guide rails.

9. The workpiece changer as set forth in claim 1, wherein the gripper or the grippers are adapted to fit underneath a workpiece or a workpiece palette and possess two gripping and/or lifting arms.

10. The workpiece changer as set forth in claim 1, wherein the gripper or grippers possess two gripping or lifting arms able to be moved like gripping jaws toward each other.

11. The workpiece changer as set forth in claim 1, wherein as a self-contained unit the changer is able to be placed in front of a machining machine.

12. A workpiece changer for transfer of workpieces or workpiece palettes between a storage arrangement in a front of a machining machine for such workpieces and/or workpiece palettes and a workpiece table of such machining machine, comprising:

a gripper means for taking up and putting down workpieces or workpiece palettes, a linear drive for transfer of the gripper means between a first position at the storage arrangement and a second position at the workpiece table, wherein the gripper means is rotatable about a vertical axis when moving between the first position and the second position, the storage arrangement possessing at least one change station for delivery and acceptance of workpieces or workpiece palettes by the gripper means, and a conveyor means for the supply and removal of palette and/or workpiece receiving means to and from the change station, wherein the gripper means is a double gripper with grippers pointing in opposite directions, and wherein the conveyor means as a whole or palette thereof and/or workpiece receiving means and/or the gripper means have a lifting drive.

* * * * *